(12) United States Patent
Patel et al.

(10) Patent No.: US 7,730,524 B2
(45) Date of Patent: Jun. 1, 2010

(54) DYNAMIC COLLATION OF DOMAIN FOR USER AUTHENTICATION ON EXISTING DEVICES

(75) Inventors: Parul D. Patel, Fairport, NY (US); Michael William Barrett, Fairport, NY (US); Robert Benjamin Wilkie, Rochester, NY (US); Bernard Roch Heroux, Jr., Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1157 days.

(21) Appl. No.: 11/345,491

(22) Filed: Feb. 1, 2006

(65) Prior Publication Data

US 2007/0180505 A1    Aug. 2, 2007

(51) Int. Cl.
G06F 7/24 (2006.01)
G06F 17/30 (2006.01)
G06F 17/40 (2006.01)

(52) U.S. Cl. .................. 726/5; 707/1; 707/3; 707/6; 709/230

(58) Field of Classification Search .............. 726/14, 726/5; 713/201; 709/220
See application file for complete search history.

(56) References Cited

U.S. PATENT DOCUMENTS

| | | | |
|---|---|---|---|
| 6,219,790 B1 * | 4/2001 | Lloyd et al. | 726/14 |
| 6,601,094 B1 * | 7/2003 | Mentze et al. | 709/220 |
| 2003/0037044 A1 * | 2/2003 | Boreham et al. | 707/3 |
| 2003/0120948 A1 * | 6/2003 | Schmidt et al. | 713/200 |
| 2003/0163730 A1 * | 8/2003 | Roskind et al. | 713/201 |
| 2004/0003287 A1 * | 1/2004 | Zissimopoulos et al. | 713/201 |
| 2004/0054662 A1 * | 3/2004 | Dworkis et al. | 707/3 |
| 2005/0198036 A1 * | 9/2005 | Nedkov et al. | 707/10 |

* cited by examiner

*Primary Examiner*—Taghi T Arani
*Assistant Examiner*—Kenneth Chang
(74) *Attorney, Agent, or Firm*—Fay Sharpe LLP

(57) ABSTRACT

Improved network authentication process (NAP) allows omission of difficult-to-remember credentials, such as domain names/contexts, when users log on to a device via a local user interface (UI). Embodiments receive some authentication credentials, such as username and password, and obtain and parse reply data containing additional authentication credentials, such as domain name or context associated with the user, from a network directory server. The process sends now-complete authentication credentials to the authentication server, and authentication results are returned to the authentication service, which trickles the information to the local UI used to enter credentials.

16 Claims, 3 Drawing Sheets

DYNAMIC COLLATION OF DOMAIN FOR USER AUTHENTICATION ON EXISTING DEVICES

BACKGROUND AND SUMMARY

Many digital, networked devices, such as computers and reproduction apparatus, include the ability to authenticate a user of the apparatus. This is particularly true for providers of publicly accessible equipment that requires authentication for access, such as public computer terminals, photocopiers, and printers, but can also be true of devices within a company that track resource usage and allocate expenditures by user and/or department. Such authentication over the network is often performed using protocols such as Kerberos, simple message block (SMB), or Novell Directory Services (NDS). When a user enters login credentials for these protocols, he or she must provide a username and password, but must supply an additional identifier, such as an appropriate realm, domain, or tree/context, for authentication. In some authentication schemes, the user can select the realm, domain, or tree/context from a list preconfigured by a system administrator (SA) and displayed on a user interface (UI) of the device. However, the device may not allow for enough values to be preconfigured and/or all values may not be configured for all devices. The latter problem is particularly true for international companies where traveling employees would not find their information on the preconfigured list. Even if a user was allowed to manually enter information, it is often difficult for a user to remember a realm, context/tree, or a domain on top of his/her user name and password. In addition, allowing a user to manually enter his or her own information for authentication purposes poses a security risk, since the user could be authenticated for use of servers on the network for which they do not have proper permissions.

Some prior solutions to this problem include the creation and use of guest accounts, alterations of preconfigured lists to include visiting employees, and/or disabling of network authentication. Others include a card reader or the like that reads a card, such as a swipe card or smart card, that holds the users realm, domain, or tree/context. All of these solutions, however, suffer from drawbacks including reduced security, time-intensive addition of tasks to SA work loads, and inconvenience.

To overcome the drawbacks outlined above with minimal security risk, inconvenience, and SA work load increase, embodiments include a method in which a network authentication process (NAP) connected to a device receives an authentication request via the device UI. The NAP gathers user credentials including user name and password from that request, and forwards the user name to a directory server, such as an LDAP server, requesting the appropriate additional authentication values (realm, domain, or context based on the configured authentication protocol) for that user. In embodiments, the method feature is enabled by a SA, such as via Simple Network Management Protocol (SNMP) or a Web based UI. Additionally, embodiments allow a SA to configure what field(s) on the directory server contains the required information.

In embodiments, once the information is pulled from the directory server, it is parsed by the NAP to extract specific values needed. The parsed value is then used when passing the user's credentials to the authentication server. This way the user does not need to know his or her realm, domain or context.

DETAILED DESCRIPTION

Figure 1:
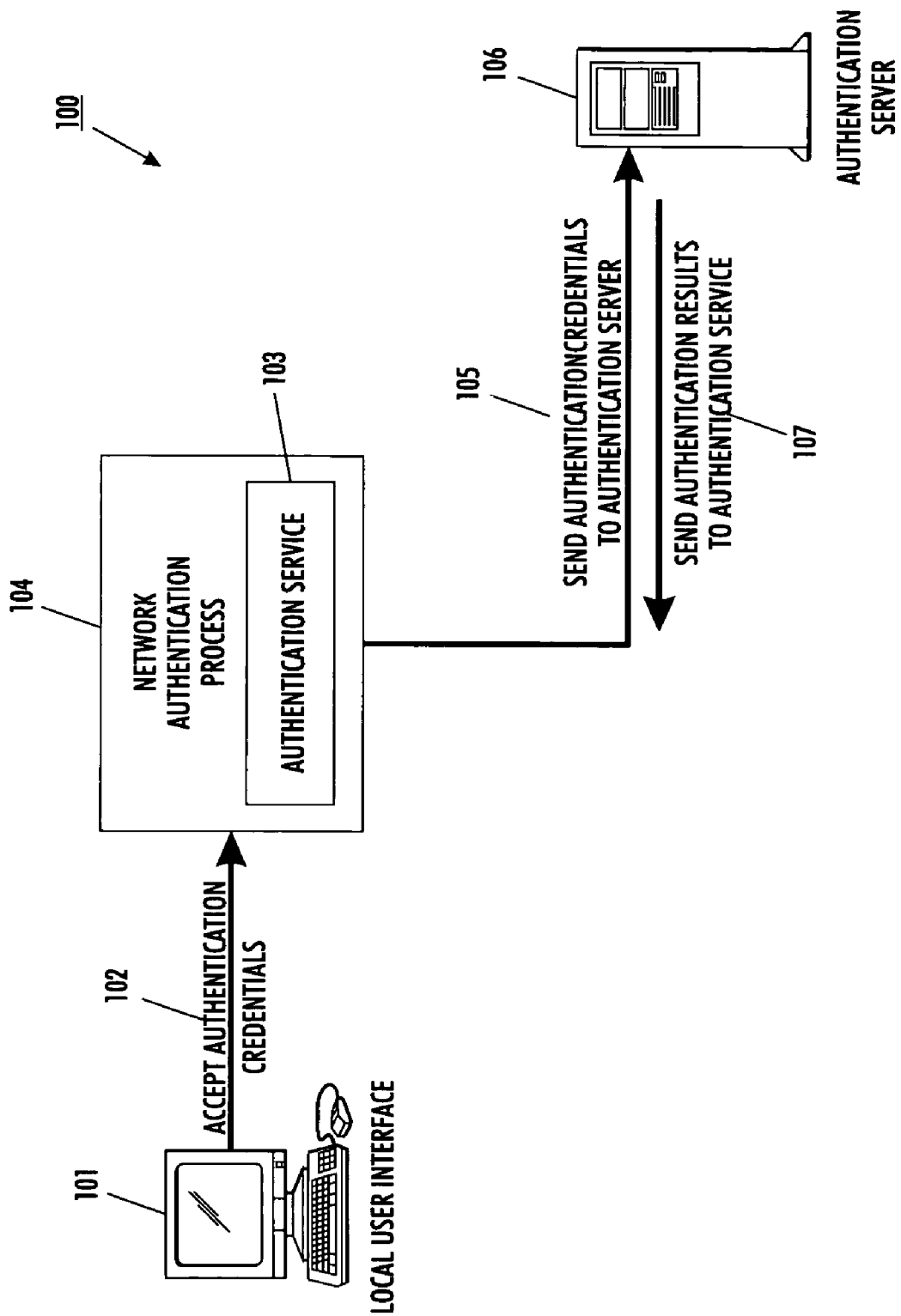
FIG. 1 shows a schematic representation of an authentication process according to the prior art.

With reference to FIG. 1, the current authentication process 100 is outlined in schematic form. As suggested above, a device with which the current process and embodiments can be used will typically include a local user interface (UI) 101 with which a user can interact with the device, its operating system, applications on the device, and/or remote devices connected to the UI device via a computer network. The UI can be a command line interface, a graphical interface, or other interface providing suitable interaction. The user enters authentication credentials 102, such as user provided or selected domain or context, at the local UI, which sends the authentication credential data to an authentication service 103 via the NAP 104. The authentication service process 103 will herein be called a "security manager," and it transmits the authentication credentials 105 with an authentication server 106 to authenticate the user. The results are sent back to the security manager 107, which then trickles the results back to the local UI 101.

Figure 2:
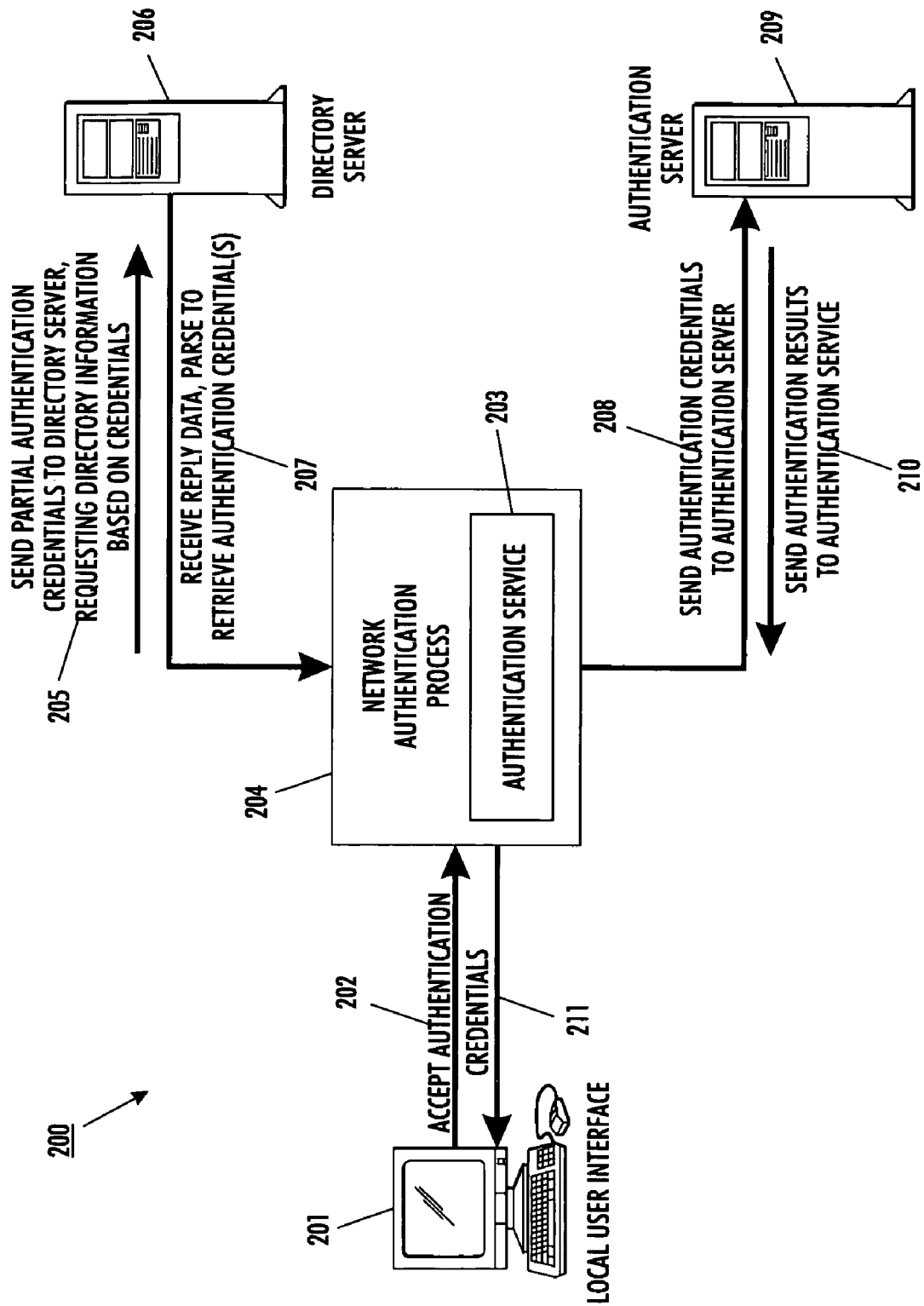
FIG. 2 shows a schematic representation of an improved authentication process according to embodiments.

As seen schematically in FIG. 2, embodiments comprise a modified authentication process 200 in which a user enters partial authentication credentials 202 at the local UI 201 without needing to include some portion or portions of the credentials, such as the realm, domain, or context. The UI 201 sends the credential data to the security manager 203 of the NAP 204, which initiates communication 205 to a directory server 206, such as a LDAP server, employing the user provided authentication credentials. The security manager receives reply data 207 from the directory server 206, which data includes the needed credential data, such as a realm, domain, or tree/context, but also includes unneeded data. The NAP 204 parses the reply data from the directory server based on the authentication protocol to obtain the missing credentials, such as fully qualified realm, domain, or context, from the reply data. The NAP 204 then sends the authentication credentials, including that retrieved from the directory server reply data, to the security manager, which then communicates 208 with an authentication server 209 to authenticate the user. The authentication server sends the results back to the security manager 210, which then trickles up the results 211 back to the device local UI 201.

In embodiments in which the network employs Active Directory Server (ADS) or LDAP, parsing comprises obtaining data from the SA configured field "distinguishedName" to obtain the user's fully qualified domain. This can be achieved, for example, by using the "getDistinguishedName" command, or by using the LDAP "ldap_get_dn" function call. The reply data in this field is generally similar to the following:

CN=MCHPM024,OU=Users,OU=SBS-PR,
    OU=MCHP,OU=DE,DC=div,DC=co,DC=cmpy,
    DC=com Here, the fully qualified domain name for the user is "div.co.cmpy.com" and CN=common name, OU=organizational unit, and DC=domain context. To obtain this domain name, the system parses the retrieved distinguishedName field by searching for the "DC=" instances, taking the information between the "DC=" and comma or end of field/data, and concatenating or combining the taken information in order with period separators/delimiters therebetween as domain delimiters.

When the network employs NDS, embodiments parse the SA configured field "dn" to obtain the user's context. The "dn" field data is similar to the following:

dn:cn=sunproxy,o=USAG

Here, the context is "sunproxy.USAG" and dn=distinguished name, cn=common name, and o=organization. In embodiments, the system searches for the "cn=" and "o=" tags, takes the information following the equals sign and preceding the next comma or end of field, and combines the information in order with periods therebetween to return the context of "sunproxy.USAG". Alternatively, embodiments parse the reply data from the directory server into tags based on delimiters, such as commas or semicolons, separating portions of the data. Embodiments then search the tags for protocol-dependent identifiers, strips the identifiers from the tags, and stores the remainders of the tags, the remainders being portions of the domain name/context associated with the user. The portions are finally concatenated with domain delimiters between the portions to obtain the realm, domain name, or context.

An example of some model code that could be employed to achieve embodiments is as follows:

```
Loop until all tags are processed
{
Parse tags based on , or ; delimiter)
{
If server type is NDS
    {
    if the tag has cn= at the beginning
        remove the tag
    Else
        Keep the tag but remove the white spaces
    }
    if server type is ADS
    {
    if tag does not have dc= at the beginning
        remove the tag
    if tag has dc= at the beginning
        remove the dc= delimiter but keep the rest of the tag
        remove white spaces
    }
Concatenate tags and use . for the delimiter
}
}
```

Embodiments require that the Authentication Server be setup with domain referrals. However, embodiments allow that a device originating the request for authentication could be any system that can connect to a network, and that the Authentication Server and Directory Server can be the same hardware. Additionally, while embodiments are implemented in networks in which the directory server and authentication server use the same protocols, it is foreseeable that embodiments could be implemented in networks in which the directory and authentication servers use different protocols.

Figure 3:
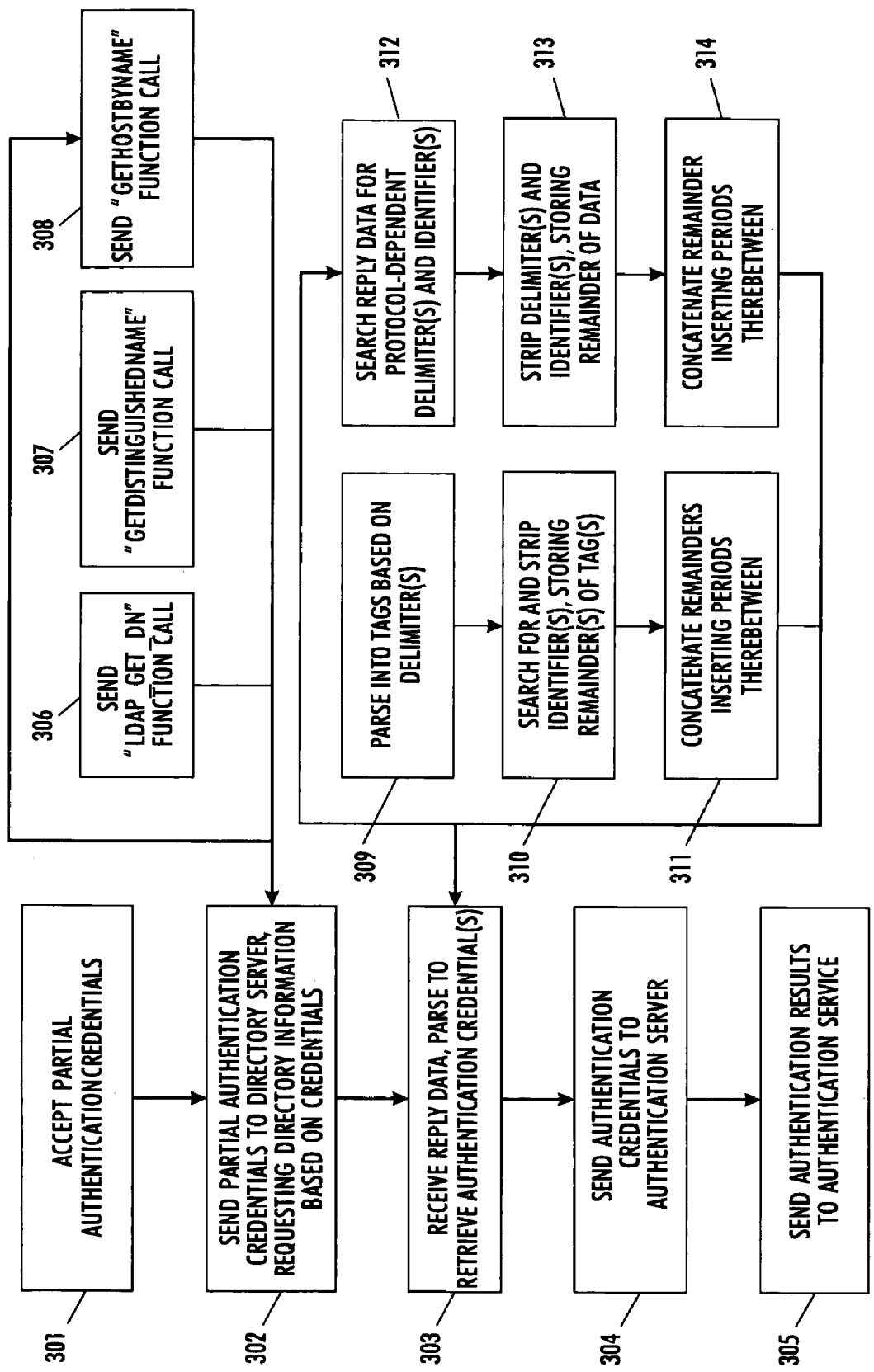
FIG. 3 shows a schematic flow diagram of a process according to embodiments.

Embodiments thus employ a method such as that shown in FIG. 3 and comprising accepting partial authentication credentials 301, sending the partial authentication credentials to a directory server and requesting directory information based on the credentials 302, and receiving the reply data and parsing it to retrieve missing authentication credentials 303. The method further comprises sending the now complete authentication credentials to an authentication server 304 and sending authentication results to the authentication service 305.

Sending partial authentication credentials and requesting directory information 302 can include sending a "ldap_get_dn" function call 306, sending a "getDistinguishedName" function call 307, and sending a "getHostbyName" function call 308 depending on the particular environment and protocol in which embodiments are employed. Other function calls could be used as appropriate for other protocols or network environments.

Parsing the reply data 303 can comprise parsing into tags based on delimiters 309, searching for and stripping identifiers and storing remainders of tags 310, and concatenating the stored remainders and inserting domain delimiters, such as periods, between the remainders 311 to obtain the full domain name. Alternatively, parsing 303 can include searching the reply data for protocol-dependent delimiters and identifiers 312, stripping the delimiters and storing the remainder of the data 313, and concatenating the remainder with periods inserted between segments 314 to obtain the full domain name.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A network authentication process comprising:
accepting at least one authentication credential comprised of a realm, a domain, and a context;
determining an authentication protocol employed by the network, wherein determining comprises determining that the protocol is a NDS-based protocol, searching comprises searching for "cn=" as a first identifier and "o=" as a second identifier, and the domain delimiter comprises a period, resulting in a context of the NDS-based protocol;
querying a directory server with at least a portion of the at least one authentication credential;
receiving reply data from the directory server;
parsing the reply data to retrieve at least one omitted authentication credential, wherein parsing comprises:
  dividing the reply data into tags based on the presence of at least one delimiter between portions of the data;
  determining what protocol is employed by the directory server;
  searching for at least one protocol-dependent first identifier in each tag;
  removing the at least one first identifier when found and storing a remainder of each tag in which the at least first identifier is found;
  searching for at least one protocol-dependent second identifier in each remaining tag; and
  removing the at least one second identifier when found and storing a remainder of each tag in which the at least second identifier is found; and concatenating the stored remainders in order found with domain delimiters therebetween;

sending the at least one authentication credential and the at least one omitted authentication credential to an authentication server;

receiving authentication results from the authentication server; and transmitting the authentication results to an authentication service to authenticate a user.

2. The authentication process of claim 1 wherein parsing comprises:

determining which protocol is employed by the directory server;

searching the reply data for at least one reply delimiter and at least one identifier based on the protocol;

retrieving components of the at least one omitted authentication credential from the reply data; and concatenating the components with domain delimiters therebetween.

3. The authentication process of claim 2 wherein determining comprises determining that the protocol is a Kerberos-based protocol, searching comprises searching for "dc=" as a lead identifier and at least one of a comma and an end of field as a reply delimiter, and the domain delimiter comprises a period, resulting in a domain of the Kerberos-based protocol.

4. The authentication process of claim 2 wherein determining comprises determining that the protocol is a NDS-based protocol, searching comprises searching for at least one of "cn=" and "o=" as a lead identifier and at least one of a comma and an end of field as a reply delimiter, and the domain delimiter comprises a period, resulting in a context of the NDS-based protocol.

5. The authentication process of claim 1 wherein determining comprises determining that the protocol is a Kerberos-based protocol, searching comprises searching for "dc=" as a first identifier, and the domain delimiter comprises a period, resulting in a domain of the Kerberos-based protocol.

6. The authentication process of claim 1 wherein the at least one delimiter comprises a comma.

7. The authentication process of claim 1 wherein the at least one delimiter comprises a semicolon.

8. The authentication process of claim 1 wherein querying comprises sending a "getDistinguishedName" command to the directory server.

9. The authentication process of claim 1 wherein querying comprises sending a "ldap_get_dn" function call to the directory server.

10. In a digital network to which computers and other enabled devices can be connected for communication therebetween, the network including at least one directory server and at least one authentication server, a network authentication process resident on a device connected to the network and including a user interface with which a user can enter authentication credentials comprised of a realm, a domain and a context, the network authentication process comprising:

determining that the protocol is a NDS-based protocol, searching comprises searching for "cn=" as a first identifier and "o=" as a second identifier, and the domain delimiter comprises a period, resulting in a context of the NDS-based protocol;

querying a directory server with at least a portion of authentication credentials entered by a user, a format of the query depending upon a protocol employed by the network and the directory server;

receiving reply data from the directory server;

retrieving at least one omitted authentication credential from the reply data, wherein retrieving the at least one omitted authentication credential comprises:

dividing the reply data into tags based on the presence of at least one delimiter between portions of the data;

searching for at least one protocol-dependent first identifier and, if the protocol uses it, at least one protocol-dependent second identifier in each tag;

removing the identifiers when found and storing a remainder of each tag in which the at least first identifier is found; and concatenating the stored remainders in an order in which they were found, inserting domain delimiters therebetween;

sending the at least a portion of authentication credentials entered by a user and the at least one omitted authentication credential retrieved from the reply data to an authentication server;

receiving authentication results from the authentication server; and transmitting authentication results received from the authentication server to an authentication service, thereby authenticating a user on the device.

11. The authentication process of claim 10 wherein querying comprises sending a "getDistinguishedName" command to the directory server.

12. The authentication process of claim 10 wherein querying comprises sending a "ldap_get_dn" function call.

13. The authentication process of claim 10 wherein determining comprises determining that the protocol is a Kerberos-based protocol, searching comprises searching for "dc=" as a first identifier, and the domain delimiter comprises a period, resulting in a domain of the Kerberos-based protocol.

14. The authentication process of claim 10 wherein the at least one delimiter comprises a comma.

15. The authentication process of claim 10 wherein the at least one delimiter comprises a semicolon.

16. A network authentication process comprising:

accepting at least one authentication credential comprised of a realm, a domain and a context;

determining an authentication protocol employed by the network, wherein determining comprises determining that the protocol is a NDS-based protocol, searching for at least one of "cn=" and "o=" as a lead identifier and at least one of a comma and an end of field as a reply delimiter, and the domain delimiter comprises a period, resulting in a context of the NDS-based protocol;

querying a directory server with at least a portion of the at least one authentication credential;

receiving reply data from the directory server;

parsing the reply data to retrieve at least one omitted authentication credentials; wherein parsing comprises:

dividing the reply data into tags based on the presence of at least one delimiter between portions of the data;

determining what protocol is employed by the directory server, wherein determining comprises determining that the protocol is a NDS-based protocol, searching comprises searching for "cn=" as a first identifier and "o=" as a second identifier, and the domain delimiter comprises a period, resulting in a context of the NDS-based protocol;

searching for at least one protocol-dependent first identifier in each tag;

removing the at least one first identifier when found and storing a remainder of each tag in which the at least first identifier is found;

searching for at least one protocol-dependent second identifier in each remaining tag;

removing the at least one second identifier when found and storing a remainder of each tag in which the at least second identifier is found; and concatenating the stored remainders in order found with domain delimiters there between;

sending the at least one authentication credential and the at least one omitted authentication credential to an authentication server;

receiving authentication results from the authentication server; and transmitting the authentication results to an authentication service to authenticate a user.

* * * * *